M. G. NORTON.
PIN.
APPLICATION FILED MAR. 29, 1911.
1,047,556.
Patented Dec. 17, 1912.
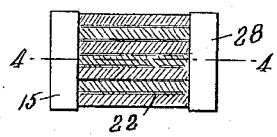
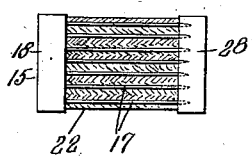
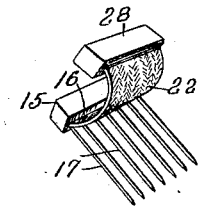
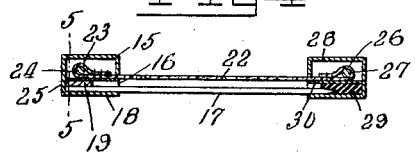
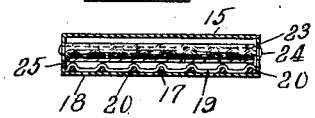
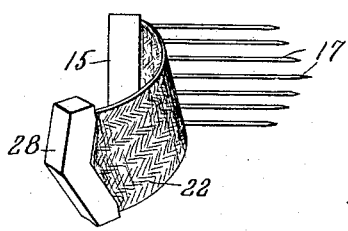
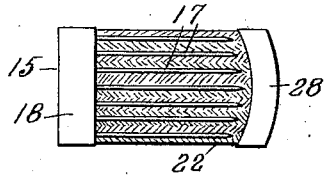
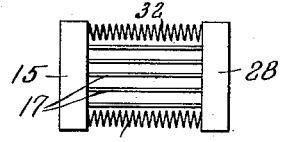
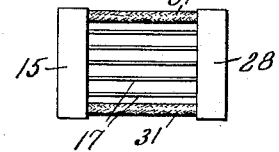
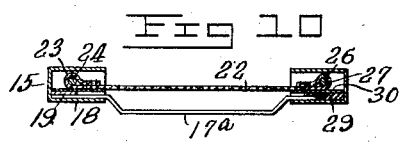
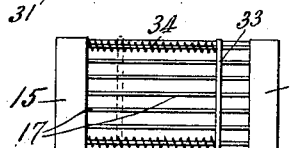
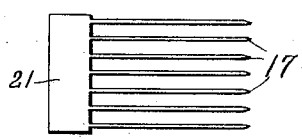
Inventor
Moses G. Norton
Witnesses
By
Attorney

UNITED STATES PATENT OFFICE.

MOSES G. NORTON, OF SAN FRANCISCO, CALIFORNIA.

PIN.

1,047,556.  Specification of Letters Patent.  Patented Dec. 17, 1912.

Application filed March 29, 1911. Serial No. 617,767.

*To all whom it may concern:*

Be it known that I, MOSES G. NORTON, a citizen of the United States, residing at San Francisco, city and county of San Francisco, and State of California, have invented new and useful Improvements in Pins, of which the following is a specification.

This invention relates to a novel security pin, and has for its object to provide an article which may have the qualities both of use and ornament, and which may be made in a number of forms, the shape or structure of which depends upon the uses to which it is to be applied.

With this object in view, the invention consists of the construction, combination and arrangement of parts hereinafter described and claimed and illustrated in the accompanying drawings, in which, Figure 1 is a view of one form of the pin looking at its outer or exposed side, Fig. 2, an under side view of the same form of pin, Fig. 3, a perspective view of the pin in position to be attached to a garment or other article, Fig. 4, a longitudinal sectional view, enlarged on the line 4—4 of Fig. 1, Fig. 5, a transverse sectional view on the line 5—5 of Fig. 4, Fig. 6, a view showing a different arrangement of the pins and the shape of the housing, Fig. 7, an underside view of another arrangement of pins with the housing shaped to correspond, the resilient means being shown under tension to release the pin points, Figs. 8 and 9, other modified forms of the pin, Fig. 10, an enlarged longitudinal sectional view showing the pins offset between the head and the housing, Fig. 11, a further modified form of the pin, and Fig. 12 shows a modified means for forming the pins integral with a supporting head.

Like reference characters are used for the same parts in all the figures.

Referring to Figs. 1 to 5 inclusive of the drawing, 15 indicates the head of the improved pin, constructed in this instance of sheet metal folded into a hollow structure closed at its ends and provided on one side with a longitudinal slot 16 extending from end to end of the head. Fastened in the head in any suitable manner, are a plurality of pins 17 of any desired length which project from the slot 16 parallel to one another and preferably perpendicular to said head. One means of securing the pins in the head 15 and illustrated in Figs. 4 and 5 is to place the inner ends of the pins on the bottom 18 of the hollow head and cover them with a plate 19 having a number of parallel grooves 20 on its under side suitably spaced and extending across said plate, which grooves engage the pins and hold them in place. The plate 19 may then be soldered to the head 15 and to the pins 17 thereby holding the pins rigidly in the head and in parallel relation. Other means than that described may be employed for fastening the pins in the head without departing from the spirit of the invention, the only requirement being to secure the pins in the head parallel to each other. Another means for acquiring and obtaining parallelism of the pins is illustrated in Fig. 12, which shows the pins integral with a strip 21, the whole being cut from a sheet of steel or other stiff material.

A strip of elastic material 22 which may have a loop 23 formed on one end extends into the head through the slot 16 and secured therein by a rod 24 passing through said loop and the ends 25 of the head and riveted, soldered or otherwise fastened. The elastic strip 22 of any desired length may, as shown, have a loop 26 on its opposite end and be attached by a rod 27 within a hollow housing 28 for the points of the pins 17, in the same manner as the rod 24 is fastened in the head 15.

Within the housing 28 and below the elastic material 22 may be placed some soft material like wood fiber, cork or equivalent substance 29 into which the points of the pins 17 can penetrate a short distance and be held from individual movement which would cause said pins to bend laterally and lose their parallelism. To prevent the pin points entering the elastic material 22 a plate 30 is shown inserted between the elastic material 22 and the soft material 29. These latter details are not absolutely necessary as the plate 30 and the soft material 29 may be omitted.

The pin is applied by grasping the head and housing between the fingers of the two hands and stretching the elastic material until the pins 17 are released, see Fig. 7, after which the housing and elastic are turned back as represented in Figs. 3 and 6 and the pins 17 inserted in the garment or other article. The housing is then taken in the fingers and after stretching the elastic, placed again over the points of the pins.

Instead of having pins 17 of equal length, as in Figs. 1, 2 and 3, their points may collectively form a V as in Fig. 6, or a curve as in Fig. 7, the housing being shaped accordingly if desired. As a substitute for the elastic strip such as 22, elastic cords 31, as in Fig. 8, or coil springs 32 such as represented in Fig. 9 may be employed.

Under certain conditions, as when the pin is to be used in thick goods, or to secure a number of layers of material, the body of the pins may be bent downward or offset as indicated in Fig. 10 at 17ª, thus giving greater space between the pins and the elastic 8.

In Fig. 11 is shown a pin similar to that represented in Fig. 1, with the addition of a perforated cross bar 33 mounted to slide on the pins 17 and held near the points of the same by coiled springs 34 surrounding two or more pins between the head 15 and said cross bar. The springs tend to keep the cross bar near the points of the pins 17 and when the latter are inserted in a garment the cross bar is pushed by said garment toward the head 15 and the springs compressed, which latter react when the housing is removed from the pin points and, pressing against the head 15 to which the pins are attached, assist the hand in withdrawing them from the garment.

What I claim is:—

1. In an article of the character described, an elongated hollow head slotted on one long side, a plurality of parallel pins rigidly attached to the bottom of said head and projecting outwardly through said slot, the free ends of said pins being pointed, an elongated hollow housing having a slot on one long side to receive the pointed ends of said pins, a resilient connection fastened at its ends to said head and housing respectively, a penetrable substance within said housing to engage said points and hold the pins in parallelism, and a division in the housing between the resilient connection and the penetrable substance.

2. In an article of the character described, a head, a plurality of parallel pins rigidly secured in said head, and projecting therefrom, a housing for the free pointed ends of said pins having a slot to receive said pin points, a resilient connection attached at its ends to the head and housing respectively, a bar adapted to slide on said pins, and springs surrounding two of said pins to normally hold said bar near the points of the pins.

In testimony whereof I have hereunto set my hand in presence of two subscribing witnesses.

MOSES G. NORTON.

Witnesses:
 LELAND E. KILBORN,
 DONALD ELLIOT.

---

Copies of this patent may be obtained for five cents each, by addressing the "Commissioner of Patents, Washington, D. C."

---